United States Patent [19]

Shneerov et al.

[11] Patent Number: 4,843,212

[45] Date of Patent: Jun. 27, 1989

[54] COMPOSITION OF WELDING WIRE

[76] Inventors: Yakov A. Shneerov, Rostovskaya naberezhnaya, 3, kv. 75, Moscow; Valery A. Vikhlevschuk, ulitsa Rogaleva, 9, kv. 33, Dnepropetrovsk; Arkady E. Asnis, bulvar L. Ukrainki, 2, kv. 5, Kiev; Vitaly A. Kondrashkin, ulitsa Feodosiiskaya, II, kv. I, Dnepropetrovsk; Oleg V. Filonov, ulitsa Kosiora, I2, kv. 8.; Vadim N. Gurov, ulitsa Lenina, 35, kv. 20, both of Krivoi Rog; Lia M. Gutman, bulvar L. Ukrainki, 2, kv. I4; Vadim R. Poklady, ulitsa Petrovskogo, I0, kv. 26, both of Kiev; Vasily V. Zhilinsky, ulitsa Berdyanskaya, I, kv. I63; Valery A. Polyakov, ulitsa Plekhanova, I5b, kv. 56, both of Dnepropetrovsk; Valery I. Nikitenko, prospekt Metallurgov, I4, kv. 28, Krivoi Rog; Jury V. Bashmakov, ulitsa Kosiora, II, kv. 50, Krivoi Rog; Vladislav B. Burshtein, ulitsa Lenina, 24, kv. 53, Krivoi Rog; Emanuil F. Anastasiadi, ulitsa Schepkina, I7, kv. 2, Odessa; Yaroslav I. Krainik, ulitsa Vatchenko, 72, kv. I23, Dnepropetrovsk; Konstantin P. Demerly, ulitsa Sovetskoi Armii, 30b, Odessa; Pavel V. Ignatchenko, ulitsa Bolshaya Kitaevskaya, I0, kv. 39, Kiev; Dmitry E. Kozachenko, ulitsa Kamo, 7, kv. 38, Krivoi Rog; Vitaly P. Piptjuk, pereulok Skorikovsky, 4a, kv. 20, Dnepropetrovsk, all of U.S.S.R.

[21] Appl. No.: 44,893

[22] Filed: Apr. 30, 1987

[51] Int. Cl.$^4$ .............................. B23K 35/34
[52] U.S. Cl. ................................ 219/146.23
[58] Field of Search ........... 219/146.1, 146.23, 146.24, 219/146.32, 146.41

[56] References Cited

U.S. PATENT DOCUMENTS 4,529,669  7/1985  Mori .................................. 428/683

FOREIGN PATENT DOCUMENTS

| 1483457 | 2/1972 | Fed. Rep. of Germany | 219/146.24 |
| 0144655 | 10/1980 | German Democratic Rep. | 216/146.23 |
| 0011847 | 1/1979 | Japan | 219/146.24 |
| 0664797 | 5/1979 | U.S.S.R. | 219/146.23 |
| 0863264 | 9/1981 | U.S.S.R. | |
| 1167235 | 7/1985 | U.S.S.R. | 219/146.23 |

Primary Examiner—Teresa J. Walberg
Attorney, Agent, or Firm—Burgess, Ryan & Wayne

[57] ABSTRACT

The present invention relates to compositions of welding wire comprised of carbon, manganese, silicon, aluminum, chromium, copper, nickel, calcium, rare-earth metals, iron in the following proportions, mass %:

| | |
|---|---|
| carbon | 0.03 to 0.25 |
| manganese | 0.8 to 2.2 |
| silicon | 0.7 to 2.2 |
| aluminium | 0.005 to 0.2 |
| chromium | 0.01 to 0.25 |
| copper | 0.01 to 0.25 |
| nickel | 0.01 to 0.25 |
| calcium | 0.001 to 0.02 |
| rare-earth metals | 0.01 to 0.1 |
| iron | the balance. |

2 Claims, No Drawings

COMPOSITION OF WELDING WIRE

FIELD OF APPLICATION OF THE INVENTION

The present invention relates to ferrous metallurgy and more particularly, to compositions of welding wire.

Said welding wire is widely used in making important welded metal structures and elements from carbon and low-alloy steels of various applications.

BACKGROUND OF THE INVENTION

It is known that welding wires are used, mainly in the form of activated solid wire or fluxed-core wire with a core consisting of a mixture of alloying and other components.

The welds made with the use of such wires should meet a variety of requirements. They should have a dense macrostructure free of cracks, pores, undercuts, rolls, and other defects. Besides, such mechanical properties of the weld as its ultimate strength, yield strength, impact strength, etc., should not be inferior to the same parameters of the base metal of the welded structure.

Welding of metal structures and elements from carbon and low-alloy steels with welding wires is accompanied by intensive splashing of the molten metal. The degree of splashing and the mechanical properties of the weld depend to a great extent on the composition of the welding wire.

Known in the prior art is a composition of a solid-section welding wire (Inventor's Certificate of the USSR No. 664797) comprising the following components, mass %:

| | |
|---|---|
| carbon | 0.03 to 0.25 |
| manganese | 0.8 to 2.2 |
| silicon | 0.7 to 2.2 |
| chromium | 0.03 to 1.0 |
| nickel | 0.03 to 0.45 |
| zirconium | 0.05 to 0.3 |
| calcium | 0.001 to 0.02 |
| copper | 0.05 to 0.6 |
| aluminium | 0.01 to 0.5 |
| iron | the balance. |

Said composition of the welding wire is good for welding carbon and low-alloyed steels and ensures high resistance of the weld to corrosion and cold. However, the employment of said wire is accompanied by heavy sputtering of the molten metal. The splashes stick to the work and clog the nozzle of the welding torch. This calls for a labor-consuming operation of cleaning the metal structures from splashes, restricts the passage through the gas nozzle thus interfering with the protection of the arc.

There is another known composition of a solid-section welding wire consisting of the following components, mass %: (Inventor's Certificate of the USSR No. 863264):

| | |
|---|---|
| carbon | 0.02 to 0.12 |
| manganese | 0.3 to 1.0 |
| silicon | 1.0 to 1.5 |
| aluminium | 0.01 to 0.2 |
| chromium | 10 to 14.9 |
| copper | 0.3 to 1.2 |
| titanium | 0.01 to 0.2 |
| rare-earth metals | 0.01 to 0.06 |
| nickel | 4 to 8 |
| calcium | 0.001 to 0.05 |
| vanadium | 0.05 to 0.35 |
| zirconium | 0.01 to 0.2 |
| molybdenum | 2.4 to 3.5 |
| iron | the balance. |

The use of the wire of this composition is inexpedient, since it contains a large amount of such costly and scarce elements as chromium, nickel, copper, vanadium, zirconium, molybdenum.

Besides, the release of copper in an amount of more than 0.6 mass % in the form of epsilon phase ($\epsilon$-phase) impairs the quality of the weld as a result of cracking. The use of this wire also results in heavy losses of metal due to splashing. Said composition of the wire enjoys but a limited field of application, being suitable for welding metal structures made from stainless and alloyed steels only.

The utilization of the known compositions of welding wire entails the necessity for cleaning the metal structures from the stuck splashes. Up to 12% of metal of the welding wire is lost for splashing, while the amount of labor spent in stripping the work from splashes runs to 30–35% of the welding work proper.

The mechanical properties of the welds produced with the use of welding wires of known compositions fail to meet the imposed requirements for impact strength, at subzero temperatures to quote but one. The macrostructure of the produced welds does not guarantee against crystallization cracks and other defects.

BRIEF DESCRIPTION OF THE INVENTION

It is an object of the present invention to provide a composition of welding wire, which would permit producing welds featuring sufficiently high mechanical properties at a minimum splashing of metal in the course of welding.

In accordance with these and other objects the invention consists in providing a composition of welding wire, comprising carbon, manganese, silicon, aluminium, chromium, copper, nickel, calcium, rare-earth metals and iron, said components contained in the following proportions, mass %:

| | |
|---|---|
| carbon | 0.03 to 0.25 |
| manganese | 0.8 to 2.2 |
| silicon | 0.7 to 2.2 |
| aluminium | 0.005 to 0.2 |
| chromium | 0.01 to 0.25 |
| copper | 0.01 to 0.25 |
| nickel | 0.01 to 0.25 |
| calcium | 0.001 to 0.02 |
| rare-earth metals | 0.01 to 0.1 |
| iron | the balance. |

The carbon content in the composition of the welding wire ranging from 0.03 to 0.25 mass % in combination with the selected amounts of manganese, silicon and chromium ensure the requisite strength of the weld metal. Introduction of less than 0.03 mass % of carbon into the composition of welding wire fails to ensure the requisite mechanical properties of the weld, since this does not cause the required content of carbon in the weld metal. Conversely, the carbon content exceeding 0.25 mass % is impracticable as causing hot cracks in the weld.

Provision in the welding wire of the selected amounts of manganese, silicon, and chromium, namely, 0.8 to 2.2; 0.7 to 2.2 and 0.01 to 0.25 mass %, respectively, ensures a dense macrostructure of the weld, free of cracks, pores, undercuts, rolls and other defects. The contents of these components in the composition of the welding wire below the lower limit fails to produce solid macrostructure of the weld. Their content above the upper limit leads to embrittlement of the weld metal and to its chemical heterogeneity.

The selected amount of copper in the composition of welding wire (0.01 to 0.25 mass %) is favourable with respect to the corrosion resistance of the weld metal. The increase of copper content above the upper limit affects adversely the quality of welding wire and weld. The copper content below the lower limit does not influence the corrosion resistance of the weld.

The amount of aluminium in the present composition (0.005 to 0.2 mass %) ensures the required deoxidation of the weld metal and its fine-grained structure. If the aluminium content exceeds 0.2 mass %, this reduces the plasticity of the wire rod. The aluminium content below the above-quoted lower limit proves insufficient for deoxidation of the weld metal and comminution of its structure. The nickel component in the composition of welding wire influences favorably the impact strength of the weld metal. Nickel content below 0.01 mass % exerts no influence on impact strength. Conversely, the amount of nickel exceeding 0.25 mass % in the welding wire results in the formation of low-melting nickel sulphides in the weld metal, oriented along the weld axis and grain boundaries. As the weld cools down the presence of the liquid interlayers of eutectic formations of nickel sulphides subjected to welding tension stresses results in the formation of crystallization cracks.

Introduction of calcium in the above-stated limits, namely, 0.001 to 0.02 mass %, into the composition of welding wire has a favourable effect on changes in the shape and nature of nonmetallic inclusions. The calcium content below 0.001 mass % does not exert any influence on the changes in the morphology of nonmetallic inclusions, while raising its content above the specified upper limit is economically inexpedient and difficult to realize.

Introduction into the composition of welding wire of aluminium jointly with calcium, produces the most favorable globular shape of nonmetallic inclusions. Besides, the presence of nickel and calcium in the welding wire is conducive to attainment of high impact strength parameters. This is attributable to comminution of the weld microstructure and to changes in the shape of nonmetallic inclusions.

The rare-earth metals in the amount of 0.01 to 0.1 mass % reduce sputtering of metal in the course of welding and raise the impact strength of the weld metal at subzero temperatures. The content of rare-earth metals in the welding wire below the lower limit does not influence the sputtering of metal. Introduction into welding wire of rare-earth metals in the amount exceeding the upper limit is inexpedient, since the level of metal sputtering is not lowered, whereas the external appearance of the weld is impaired.

Introduction of rare-earth metals in the above-specified limits in combination with the above-stated amounts of other components in the present composition of welding wire results in an unexpected effect of small-drop (fine-spray) transfer of electrode metal during welding, and of a higher stability of the welding arc.

It is good practice to introduce titanium into the composition of welding wire in the amount of 0.002 to 0.2 mass % of the total amount of the composition.

Additional introduction of the indicated amount of titanium into the composition of welding wire ensures further deoxidation of the welding pool, comminution of the microstructure of weld metal and reduction of sputtering of electrode metal during welding. The titanium content above 0.2 mass % is inexpedient because of worsening of the wire plasticity. If titanium content is under 0.002 mass %, the microstructure of the weld metal is not comminuted.

The combination in the welding wire of rare-earth metals in an amount over 0.01 mass %, titanium (not less than 0.002 mass %) and aluminium in an amount of at least 0.005 mass % enables the obtaining of high impact strength characteristics of the weld.

The disclosed compositions of welding wire ensure stability of gas-arc welding with a minimum sputtering of electrode metal.

For example, the splashing coefficient ($\Psi$) during employment of the herein-proposed compositions of welding wire is 4–10 times lower than that of the prior art compositions. The welding process is characterized by small-drop (fine-spray) transfer of electrode metal. The arc length before extinction which determines the stability of its burning is 1.5–2 times that of the known compositions.

Besides, the welds produced with the welding wire of the disclosed compositions are noted for a solid macrostructure and absence of cracks, pores, undercuts, rolls and other defects. The work done by impact (KV) on a Charpy V-notched welded bar at 253 K is 10–30 J higher. Besides, the use of the disclosed compositions of welding wire increases the strength characteristics (Rm, Re) of the weld.

The herein-proposed compositions of welding wire can be utilized in making important welded metal structures in ship-building, locomotive and wagon-building industries, motor vehicle manufacture, crane manufacture, chemical, petroleum and agricultural machine building, in construction and other metal-consuming fields. The welding wires of the disclosed compositions can be used instead of the known standard solid-section wires for welding in shielding atmosphere (carbon dioxide, mixture of active gases, argon-based gas mixture).

The welding wires of the herein-proposed compositions can also be used instead of flux-cored wire during $CO_2$-shielded arc welding.

The proposed compositions of welding wire can be effectively used in automatic and mechanized welding. And most effective these compositions prove to be in welding by robots.

The manufacture of welding wire composition calls neither for sophisticated costly equipment nor for scarce and expensive materials.

DETAILED DESCRIPTION OF THE INVENTION

The method of manufacture of welding wire compositions is simple technologically and is realized as follows.

The compositions can be produced in converters, electric steel-melting and open-hearth furnaces. For this purpose the source components are loaded in the required amount into a steel-melting plant, melted, held as long as necessary and discharged into the steel-pouring ladle and mould. The metal is cast into ingots which are then rolled into wire rod.

Making wire rods of 5.5–6.5 mm dia. from the proposed composition is technologically simple. The mechanical properties of the wire rod are as follows: ultimate strength not over 740 MPa, reduction of area not under 48%.

The welding wire produced from wire rods can be made by cold drawing of the wire rod to a diameter of 0.8 mm and over with or without subsequent copper plating. The ultimate strength of the produced welding wire is 830 to 1320 MPa.

The invention will be now further elucidated by the following examples.

EXAMPLE 1

The composition of the welding wire is as follows, mass %:

| | |
|---|---|
| carbon | 0.13 |
| manganese | 2.0 |
| silicon | 1.5 |
| chromium | 0.20 |
| copper | 0.15 |
| aluminium | 0.12 |
| nickel | 0.20 |
| calcium | 0.007 |
| rare-earth metals | 0.08 |
| iron | the balance. |

This composition is produced in a steel-melting plant. The required amounts of source components are melted, the liquid melt is held as required and discharged into a steel-pouring ladle. The metal is cast into ingots which are rolled out into wire rods and then into wire of 1.6 mm diameter.

Then said welding wire is used to weld steel specimens 20 mm thick containing 0.14 to 0.21 mass % of carbon in $CO_2$ atmosphere by downhand method. The value of D.C. current is 380 to 400 A, arc voltage 32 to 34 V at heavy-crane building enterprises.

The process of welding with wire of the above composition is accompanied by small-drop (fine-spray) transfer of electrode metal. The arc length before extinction ranges from 18 to 20 mm. The produced weld is free from pores, cracks and other macrodefects.

For the sake of comparison, the specimens of a similar size are welded under identical conditions with the welding wire of the prior-art composition, mass %:

| | |
|---|---|
| carbon | 0.12 |
| manganese | 1 |
| silicon | 1 |
| aluminium | 0.15 |
| chromium | 12 |
| copper | 0.5 |
| titanium | 0.15 |
| rare-earth metals | 0.05 |
| nickel | 5 |
| calcium | 0.007 |
| vanadium | 0.2 |
| zirconium | 0.15 |
| molybdenum | 3.1 |
| iron | the balance. |

The process of welding with the wire of the composition known heretofore is accompanied by large-drop transfer of electrode metal and splashing. The length of the arc before extinction is 9–12 mm. The produced weld is pore-free. However, due to a larger content in this composition of copper which is released in the form of an epsilon-phase, crystallization cracks are formed in the weld metal.

The characteristics of the welding process with the wire of the known and herein-proposed compositions along with the mechanical properties of the produced welds are given in Table 1.

TABLE 1

| Composition of welding wire | Metal splashing coefficient, $\psi$, % | Mechanical properties of welds | | |
|---|---|---|---|---|
| | | Ultimate strength, Rm, MPa | yield point, Re, MPa | Impact work, Charpy V-notched bars at 253 K, KV, J |
| Known | 14–15 | 480–520 | 340–360 | 21–30 |
| Disclosed | 1.9–2.2 | 540–550 | 390–430 | 48–52 |

It can be concluded from the data of Table 1 that the welding wire of the disclosed composition reduces substantially the splashing of electrode metal and raises the mechanical properties of the weld, particularly the weld impact strength at subzero temperatures.

EXAMPLE 2

The welding wire has the following composition, mass %:

| | |
|---|---|
| carbon | 0.03 |
| manganese | 0.8 |
| silicon | 0.7 |
| Chromium | 0.01 |
| copper | 0.01 |
| aluminium | 0.006 |
| nickel | 0.01 |
| calcium | 0.001 |
| rare-earth metals | 0.01 |
| iron | the balance. |

The wire of said composition is used for welding specimens 20 mm thick from steel containing 0.07 to 0.12 mass % of carbon in carbon dioxide atmosphere. The welding conditions and positions are similar to those described in Table 1. The welding process takes place in agricultural machine-building enterprises.

Welding of specimens with the welding wire of the herein-proposed composition is accompanied by small-drop (fine-spray) transfer of electrode metal. The macrostructure of the weld metal is free from defects. The characteristics of the welding process and properties of the weld metal are listed in Table 2 below.

TABLE 2

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars at 253 K, KV, J |
| 1.9–2.3 | 540–580 | 410–430 | 50–60 |

EXAMPLE 3

The welding wire has the following composition, mass %:

| | |
|---|---|
| carbon | 0.25 |
| manganese | 2.18 |
| silicon | 2.19 |
| chromium | 0.25 |

| | |
|---|---|
| copper | 0.20 |
| aluminium | 0.20 |
| nickel | 0.23 |
| calcium | 0.017 |
| rare-earth metals | 0.09 |
| iron | the balance. |

Welding is carried out with a 1.2 mm diameter wire in a vertical position in $CO_2$ atmosphere. The specimens welded are 20 mm thick, prepared from steel containing 0.07–0.12 mass % of carbon, D.C. current intensity is 140–160 A, arc voltage is 9–21 V.

The process of welding with the wire of the disclosed composition is accompanied by small-drop (fine-spray) transfer of electrode metal. The weld is free from defects. The characteristics of the welding process and the properties of the weld metal are given in Table 3.

TABLE 3

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars, at 253 K, KV, J |
| 2.1–2.8 | 580–600 | 420–460 | 47–51 |

EXAMPLE 4

The welding wire is of the following composition, mass %:

| | |
|---|---|
| carbon | 0.17 |
| manganese | 1.2 |
| silicon | 1.5 |
| chromium | 0.15 |
| copper | 0.15 |
| aluminium | 0.017 |
| nickel | 0.16 |
| calcium | 0.009 |
| rare-earth metal | 0.06 |
| iron | the balance. |

The welding wire of this composition was used to weld specimens 20 mm thick of steel containing 0.08 to 0.13 mass % of carbon in a carbon dioxide atmosphere. The welding conditions and positions are similar to those specified in Example 1. The welding process was conducted at a wagon-building enterprise.

The process of welding the specimens with the wire of the above-stated composition was accompanied by small-drop (fine spray) transfer of electrode metal. The weld is free from defects. The characteristics of the welding process and weld properties are given in Table 4.

TABLE 4

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars, at 253 K, KV, J |
| 2.3–2.9 | 570–600 | 400–450 | 52–58 |

EXAMPLE 5

The welding wire has the following composition, mass %:

| | |
|---|---|
| carbon | 0.09 |
| manganese | 1.0 |
| silicon | 2.0 |
| chromium | 0.11 |
| copper | 0.25 |
| aluminium | 0.17 |
| nickel | 0.10 |
| calcium | 0.02 |
| rare-earth metals | 0.02 |
| iron | the balance. |

The welding wire of the above composition was used to weld the specimens similar to those described in Example 4. The welding conditions and positions are identical with those stated in Example 1. The welding process was conducted in a ship-building plant.

The process of welding the specimens with the wire of the above composition was accompanied by small-drop (fine-spray) transfer of electrode metal. The weld is free from defects. The characteristics of the welding process and weld properties are given in Table 5.

TABLE 5

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars at 253 K, KV, J |
| 2.4–3.0 | 570–590 | 400–440 | 48–53 |

EXAMPLE 6

The welding wire has the following composition, mass %:

| | |
|---|---|
| carbon | 0.05 |
| manganese | 0.8 |
| silicon | 2.0 |
| chromium | 0.03 |
| copper | 0.10 |
| aluminium | 0.10 |
| nickel | 0.03 |
| calcium | 0.018 |
| rare-earth metals | 0.04 |
| iron | the balance. |

The welding wire of the above-specified composition was used to weld specimens similar to those mentioned in Example 4.

The welding conditions and positions are identical with those stated in Example 1. Welding conditions as in Example 1.

The process of welding the specimens with the wire of the above composition was accompanied by small-drop (fine-spray) transfer of electrode metal. The weld is free from defects. The characteristics of welding and weld properties are given in Table 6.

TABLE 6

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars, at 253 K, KV, J |
| 2.1–2.7 | 520–560 | 390–440 | 49–55 |

EXAMPLE 7

The welding wire has the following composition, mass %:

| | |
|---|---|
| carbon | 0.03 |
| manganese | 0.87 |
| silicon | 0.79 |
| chromium | 0.01 |
| copper | 0.02 |
| aluminium | 0.009 |
| nickel | 0.02 |
| calcium | 0.0017 |
| rare-earth metals | 0.01 |
| titanium | 0.002 |
| iron | the balance. |

The welding wire of the above composition was used to weld specimens similar to those mentioned in Example 2. The welding conditions and positions are identical with those described in Example 1. The welding process was conducted at a ship-building plant.

The process of welding the specimens with the wire of the disclosed composition was accompanied by small-drop (fine-spray) transfer of electrode metal. The weld is free from defects. The characteristics of the welding process and weld properties are given in Table 7.

TABLE 7

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars, at 253 K, KV, J |
| 1.6–2.0 | 520–560 | 380–410 | 55–65 |

EXAMPLE 8

The welding wire has the following composition, mass %:

| | |
|---|---|
| carbon | 0.25 |
| manganese | 2.2 |
| silicon | 2.17 |
| chromium | 0.25 |
| copper | 0.25 |
| aluminium | 0.18 |
| nickel | 0.25 |
| calcium | 0.02 |
| rare-earth metals | 0.10 |
| titanium | 0.20 |
| iron | the balance. |

The welding wire of this composition was used to weld the specimens similar to those mentioned in Example 2.

The welding conditions and positions are identical with those given in Example 3. Welding conditions as in Example 3.

The process of welding the specimens with the wire of the disclosed composition was accompanied by small-drop (fine-spray) transfer of electrode metal. The weld is free from defects. The characteristics of the welding process and weld properties are given in Table 8.

TABLE 8

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars, at 253 K, KV, J |
| 1.8–2.1 | 560–580 | 480–500 | 52–58 |

EXAMPLE 9

The welding wire has the following composition, mass %:

| | |
|---|---|
| carbon | 0.16 |
| manganese | 1.10 |
| silicon | 1.80 |
| chromium | 0.17 |
| copper | 0.14 |
| aluminium | 0.015 |
| nickel | 0.10 |
| calcium | 0.008 |
| rare-earth metals | 0.05 |
| titanium | 0.11 |
| iron | the balance. |

The welding wire of this composition was used to weld the specimens similar to those specified in Example 2. The welding conditions and positions are identical with those mentioned in Example 1. The welding process was conducted at a locomotive-building plant.

The process of welding the specimens with the welding wire of the disclosed composition was accompanied by small-drop (fine-spray) transfer of electrode metal. The weld is free from defects. The characteristics of the welding process and weld properties are given in Table 9.

TABLE 9

| Metal splashing coefficient, $\psi$, % | Mechanical properties of welds | | |
|---|---|---|---|
| | Ultimate strength, Rm, MPa | Yield point, Re, MPa | Impact work, Charpy V-notched bars at 253 K, KV, J |
| 1.5–2.0 | 570–590 | 470–510 | 57–61 |

EXAMPLE 10

The welding wire has the following composition, mass %:

| | |
|---|---|
| carbon | 0.08 |
| manganese | 1.43 |
| silicon | 1.56 |
| chromium | 0.034 |
| copper | 0.06 |
| aluminium | 0.05 |
| nickel | 0.05 |
| calcium | 0.01 |
| rare-earth metals | 0.02 |
| titanium | 0.03 |
| iron | the balance. |

The welding wire of this composition was used to weld the specimens similar to those specified in Example 4. The welding conditions and positions are identical with those mentioned in Example 1. The welding process was conducted at a construction industry enterprise.

The process of welding the specimens with the wire of the present composition was accompanied by small-drop (fine-spray) transfer of electrode metal. The weld is free from defects. The characteristics of the welding process and weld properties are given in Table 10.

TABLE 10

| Metal splashing coefficient, ψ, % | Mechanical properties of welds | | |
|---|---|---|---|
| | Ultimate strength, Rm, MPa | Yield point, Re, MPa | Impact work, Charpy V-notched bars at 253 K, KV, J |
| 1.6–2.2 | 530–570 | 400–470 | 50–57 |

EXAMPLE 11

The welding wire has the following composition, mass %:

| | |
|---|---|
| carbon | 0.22 |
| manganese | 1.70 |
| silicon | 0.71 |
| chromium | 0.06 |
| copper | 0.13 |
| aluminium | 0.12 |
| nickel | 0.17 |
| calcium | 0.005 |
| rare-earth metals | 0.015 |
| titanium | 0.07 |
| iron | the balance. |

The welding wire of the above composition was used to weld specimens similar to those specified in Example 4. The welding conditions and positions are identical to those described in Example 1.

The process of welding the specimens with the wire of the present composition was accompanied by small-drop (fine-spray) transfer of electrode metal. The weld is free from defects. The characteristics of the welding process and properties of welds are given in Table 11.

TABLE 11

| Metal splashing coefficient, ψ, % | Mechanical properties of welds | | |
|---|---|---|---|
| | Ultimate strength, Rm, MPa | Yield point, Re, MPa | Impact work, Charpy V-notched bars at 253 K, KV, J |
| 1.7–2.1 | 520–580 | 390–450 | 52–60 |

What is claimed is:

1. A composition of welding wire, consisting essentially of carbon, manganese, silicon, aluminium, chromium, copper, nickel, calcium, rare-earth metals, and iron in the following proportions, mass %:

| | |
|---|---|
| carbon | 0.03 to 0.25 |
| manganese | 0.8 to 2.2 |
| silicon | 0.7 to 2.2 |
| aluminium | 0.005 to 0.2 |
| chromium | 0.01 to 0.25 |
| copper | 0.01 to 0.25 |
| nickel | 0.01 to 0.25 |
| calcium | 0.001 to 0.02 |
| rare-earth metals | 0.01 to 0.1 |
| iron | the balance. |

2. A composition as claimed in claim 1, which additionally contains titanium in the amount of 0.002 to 0.2 mass % of the total amount of the composition.

* * * * *